Patented May 19, 1942

2,283,683

UNITED STATES PATENT OFFICE 2,283,683

CHEMICAL PROCESS

Elmore Louis Martin, Wilmington, Del., assignor to E. I. du Pont de Nemours & Company, Wilmington, Del., a corporation of Delaware No Drawing. Application July 18, 1940, Serial No. 346,139

7 Claims. (Cl. 260—404)

This invention relates to a process for the isolation and purification of new compositions of matter from mixtures in which they may be present and, more particularly, to a process for the isolation and purification of long-chain aliphatic aminoacyl compounds.

The preparation of long-chain aliphatic amino amides or amino acids by hydrogenation of the corresponding keto compounds in the presence of ammonia leads to the production of varying amounts of the corresponding hydroxy and unsubstituted compounds, which are found as by-products in the reaction mixture together with such impurities as may have been present in the starting material. For example, it is well known that castor oil, a natural product readily adaptable to the preparation of long chain amino amides and acids, contains appreciable amounts of acids other than ricinoleic. Amino amides or amino acids containing such impurities are very difficult to purify by ordinary means such as recrystallization from organic solvents, and their boiling points are too high to make distillation feasible.

This invention has as an object the isolation of new compositions of matter from mixtures in which they may be present. A further object is the isolation and purification of long-chain aliphatic aminoacyl compounds having the following general formula:

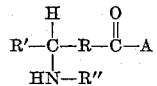

wherein R is a bivalent organic radical containing 4 to 12 atoms, R' is a monovalent acyclic organic radical containing 3 to 12 atoms, R'' is hydrogen or an acyl or a hydrocarbon radical, preferably a short-chain hydrocarbon radical and A is hydroxyl, alkoxy, or amide. Although R and R' may be heteroacyclic in nature containing oxygen, nitrogen and sulfur atoms in addition to carbon atoms, in the chain, the preferred compounds are those in which R and R' are hydrocarbon radicals. Other objects will be apparent from the following description of the invention.

These objects are accomplished by the following invention which comprises treating the mixture containing the aminoacyl compound with an aqueous solution of an organic acid in at least stoichiometric proportions, filtering off the insoluble impurities, and precipitating the aminoacyl compound from the filtrate by treatment with an alkaline reagent. The long-chain aliphatic amino compounds mentioned above; e. g., the amides, may be conveniently prepared by hydrogenation of the corresponding keto amide or keto ester in the presence of ammonia. This treatment ordinarily results in the formation of varying amounts of hydroxy and unsubstituted amides as by-products, thus rendering isolation and purification of the amino amide quite difficult. In the preferred embodiment of the invention the crude amino amide is treated with dilute aqueous acetic acid in amounts sufficient to dissolve the amino amide. The residual insoluble material, mainly composed of hydroxy, keto, and unsubstituted amides, is removed by filtration. The aqueous acetic acid solution is then treated with charcoal, filtered, and neutralized, using ammonium hydroxide. The amino amide thus precipitated is separated by filtration.

Similarly, long-chain aliphatic amino acids prepared by an alternate route which does not involve preparation of the amino amide; namely, by hydrogenation of keto acids or their salts in the presence of ammonia, may contain as impurities the corresponding hydroxy, keto, or unsubstituted acids. These impurities may be removed in a manner similar to that described in the preceding paragraph.

The following examples set forth certain well defined instances of the application of this invention. They are, however, not to be considered as limitations thereof, since many modifications may be made without departing from the spirit and scope of this invention. Parts are by weight unless otherwise stated.

Example I

The crude 12-aminostearamide resulting from the hydrogenation of 100 parts of 12-ketostearamide in the presence of ammonia was added with stirring to a solution of 56 parts of glacial acetic acid in 380 parts of water. The mixture was stirred for fifteen minutes and the insoluble material was removed by filtration. The aqueous acetic acid filtrate was washed twice with 120 parts of ethyl ether, and was then diluted with water to 900 parts. To this solution was added with stirring 106 parts of 28% ammonium hydroxide. The precipitated 12-aminostearamide was separated by filtration and air-dried. There was obtained 45.7 parts of 12-aminostearamide melting at 86° to 88° C. and having neutral equivalents of 312.4 and 312.0. (Theory requires a neutral equivalent of 298.)

Example II

In order to test the efficacy of this process in the case of amino acid, a mixture was prepared which contained the following ingredients:

| | Parts |
|---|---|
| 12-aminostearic acid | 100 |
| 12-hydroxystearic acid | 10 |
| 12-ketostearic acid | 10 |
| Stearic acid | 10 |
| 12-ketostearin | 10 |
| Hydrogenated castor oil | 10 |
| Nickel-on-kieselguhr | 2.5 |
| Ammonium chloride | 0.5 |
| Sodium hydroxide | 35 |
| 28% ammonium hydroxide | 136 |
| Water | 750 |

The mixture was warmed until a clear solution was obtained and was then allowed to cool to room temperature. The resulting semisolid material was again warmed until a clear solution resulted and was filtered to remove nickel and insoluble material (about 15 parts). The filtrate was diluted with water to 7500 parts, sufficient dilute acetic acid was added, with stirring, to give a pH of 7 to 8, and the precipitated acids were removed by filtration. The precipitated material was treated with 250 parts of formic acid in 750 parts of water and the insoluble material (32.5 parts) removed by filtration. The filtrate was neutralized with sodium hydroxide (pH 7 to 8) and the precipitate removed by filtration. After drying in a vacuum desiccator, there was obtained 97.5 parts of 12-aminostearic acid. The melting point was 128° to 135° C. After recrystallization from 750 parts of 80% aqueous tertiary-butanol the crude 12-aminostearic acid was redissolved in 500 parts of 25% aqueous formic acid, treated with activated decolorizing carbon, and filtered. The filtrate was made alkaline with sodium hydroxide, diluted with water, and filtered. It was then neutralized to a pH of 7 to 8 with dilute sulfuric acid and the precipitated 12-aminostearic acid removed by filtration. After recrystallization from 80% aqueous tertiary-butanol, the 12-aminostearic acid melted at 136° to 138° C.

Example III

The reaction mixture obtained from the hydrogenation of sodium 12-ketostearate in the presence of ammonia was worked up by the following method. After dilution with water and removal of the catalyst, the solution, which contained about 30 parts of sodium 12-aminostearate, was neutralized with 10% aqueous acetic acid to a pH of 7 to 8. The precipitated crude 12-aminostearic acid was removed by filtration, treated with 3000 parts of 50% aqueous acetic acid, and the insoluble material (4 parts, M. P. ca. 62° C.) was separated. Sodium hydroxide solution was added to the filtrate, with stirring, until the pH was 7 to 8. The precipitated 12-aminostearic acid was separated by filtration, there being obtained 22 parts of material melting at 130° to 135° C. After recrystallization from 250 parts of 80% aqueous tertiary-butanol the 12-aminostearic acid melted at 135° to 136° C.

Example IV

The crude 12-aminostearic acid was obtained by hydrogenation (in the presence of ammonia) of the mixture resulting from saponification of 30 parts of 12-ketostearin was treated with 200 parts of 25% aqueous formic acid. About 5 parts of insoluble material was removed by filtration. The filtrate was made alkaline with excess ammonium hydroxide, and the precipitated 12-aminostearic acid was separated. Recrystallization from 100 parts of 80% aqueous tertiary-butanol gave 20 parts of the amino acid melting at 128° to 135° C. This material was redissolved in 100 parts of 25% aqueous formic acid, treated with an activated decolorizing carbon, and filtered. The filtrate was made alkaline with sodium hydroxide, diluted with water, and filtered. After neutralization of the solution with dilute sulfuric acid, the precipitated 12-aminostearic acid was separated and recrystallized from 100 parts of 80% aqueous tertiary-butanol. The amino acid thus obtained melted at 136° to 138° C.

The long-chain aminoacyl compounds isolated by the process of this invention have a chain length of at least 16 atoms and a radical length of at least 7 atoms. By radical length is meant the number of atoms in the radical

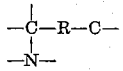

Said chain may consist solely of carbon atoms or it may contain one or more heteroatoms; e. g., oxygen, sulfur, or nitrogen. The preferred compounds are those in which the chain is composed solely of carbon atoms and examples of these are 13- or 14-aminobehenic acid, 11- or 12-aminostearic acid, 6-aminopalmitic acid, 9- or 10-aminostearic acid, and the corresponding amino amides. The preparation of these compounds is fully disclosed in the copending applications, Serial No. 346,143 and 346,144, filed on even date herewith.

In place of the acetic and formic acids of the examples other organic acids such as propionic, butyric, lactic, oxalic, citric, tartaric, glycolic, adipic, etc., may be used.

The concentration of the aqueous organic acid solution used is not critical. In general, it is necessary only that there be at least a stoichiometric ratio of organic acid to aminoacyl compound, though the preferred embodiment of the invention requires an excess of the organic acid. Aqueous solutions containing from one to sixty per cent organic acid may be used in the practice of this invention, the particular concentration to be used in any one case depending upon the aminoacyl compound being treated, the amount of solvent used, and the organic acid employed. At concentrations of greater than sixty per cent the process is still operable, but the differential solubility between the aminoacyl compound and the accompanying impurities is considerably less pronounced. Solution of the aminoacyl compound may be carried out at any convenient temperature from 15° to 95° C., slightly elevated temperatures adding somewhat to the ease of solution. In general a solution containing about 20 per cent of the aminoacyl compound; e. g., the acid, may be obtained using an aqueous formic acid concentration of 15 to 30 per cent, or an aqueous acetic acid concentration of about 50 per cent. A 20 per cent solution of the amino amide is readily obtainable with 15 to 30 per cent formic or acetic acid. The figures just quoted represent preferred embodiments of the invention and are not to be construed as limitations.

This invention affords a useful means of isolation of certain long-chain aminoacyl compounds from reaction mixtures in which they may occur. By this method, 12-aminostearic acid and its esters, 12-aminostearamide, and other related amino acids and their derivatives may be readily separated from reaction by-products and impurities. This process is valuable in that it is the only effectual means of isolation of these aminoacyl compounds in substantially pure form.

It is apparent that many widely different embodiments of this invention may be made without departing from the spirit and scope thereof and therefore it is not intended to be limited except as indicated in the appended claims.

I claim:

1. The process for the isolation of a long-chain aliphatic aminoacyl compound which comprises treating the crude compound with an aqueous solution of an organic acid present in at least stoichiometric proportions with respect to said long-chain aliphatic aminoacyl compound, filtering the resulting mixture and precipitating the desired aminoacyl compound from the filtrate by treating same with an alkaline agent.

2. The process in accordance with claim 1 characterized in that the organic acid aqueous solution has a concentration of from 1 to 60 per cent.

3. The process in accordance with claim 1 characterized in that the organic acid is acetic acid.

4. The process in accordance with claim 1 characterized in that the organic acid is formic acid.

5. The process in accordance with claim 1 characterized in that the long-chain aliphatic aminoacyl compound has the general formula:

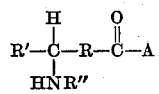

wherein A is selected from the class consisting of —OH, —NH$_2$, and alkoxy radicals, R is a bivalent open-chain organic radical containing 4 to 12 carbon atoms, R' is a monovalent acyclic organic radical containing 3 to 12 atoms, and R'' is selected from the class consisting of hydrogen, acyl radicals, and monovalent short open-chain hydrocarbon radicals.

6. The process in accordance with claim 1 characterized in that the long-chain aliphatic aminoacyl compound is 12-aminostearic acid.

7. The process in accordance with claim 1 characterized in that the long-chain aliphatic aminoacyl compound is 12-aminostearic acid and the organic acid aqueous solution is a solution of acetic acid of from 1 to 60% concentration.

ELMORE LOUIS MARTIN.